(12) United States Patent
Pradhan

(10) Patent No.: US 11,193,905 B2
(45) Date of Patent: Dec. 7, 2021

(54) ELECTRICAL DEVICE PROVIDED WITH A MOISTURE SENSOR

(71) Applicant: Hitachi Energy Switzerland AG, Baden (CH)

(72) Inventor: Manoj Pradhan, Bålsta (SE)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 17/288,055

(22) PCT Filed: Oct. 17, 2019

(86) PCT No.: PCT/EP2019/078269
§ 371 (c)(1),
(2) Date: Apr. 23, 2021

(87) PCT Pub. No.: WO2020/083748
PCT Pub. Date: Apr. 30, 2020

(65) Prior Publication Data
US 2021/0310973 A1 Oct. 7, 2021

(30) Foreign Application Priority Data
Oct. 24, 2018 (EP) ..................................... 18202331

(51) Int. Cl.
*G01N 27/22* (2006.01)
(52) U.S. Cl.
CPC ......... *G01N 27/223* (2013.01); *G01N 27/226* (2013.01)
(58) Field of Classification Search
CPC ... G01N 27/226; G01N 27/624; G01N 27/048
See application file for complete search history.

(56) References Cited

U.S. PATENT DOCUMENTS

| | | | |
|---|---|---|---|
| 3,961,246 A | 6/1976 | Waterman | |
| 4,377,783 A * | 3/1983 | Wagner | G01R 27/26 324/664 |

(Continued)

FOREIGN PATENT DOCUMENTS

| | | |
|---|---|---|
| CN | 102062746 A | 5/2011 |
| EP | 2138834 A1 | 12/2009 |

(Continued)

OTHER PUBLICATIONS

International Search Report and Written Opinion of the International Searching Authority, PCT/EP2019/078269, dated Jan. 17, 2020, 13 pages.

(Continued)

*Primary Examiner* — Alvaro E Fortich
(74) *Attorney, Agent, or Firm* — Sage Patent Group

(57) ABSTRACT

An electrical device including: voltage carrying components, a solid insulation system configured to electrically insulate the voltage carrying components, and a moisture sensor configured to detect moisture in the solid insulation system, wherein the moisture sensor includes: a capacitor having: a first electrode, a second electrode, and a dielectric material arranged between the first electrode and the second electrode, wherein the solid insulation system forms the dielectric material, the capacitance of the capacitor providing an indication of a moisture level in the dielectric material.

12 Claims, 2 Drawing Sheets

(56) References Cited

U.S. PATENT DOCUMENTS

| | | | |
|---|---|---|---|
| 4,733,166 A * | 3/1988 | Wagner | G01N 27/223 |
| | | | 324/666 |
| 6,401,742 B1 * | 6/2002 | Cramer | A01G 25/167 |
| | | | 137/78.3 |
| 2004/0100285 A1 | 5/2004 | Rains et al. | |
| 2010/0229421 A1 * | 9/2010 | Salisbury | F26B 21/06 |
| | | | 34/524 |
| 2011/0115506 A1 | 5/2011 | Eriksson et al. | |

FOREIGN PATENT DOCUMENTS

| | | |
|---|---|---|
| GB | 1016899 A | 1/1966 |
| MX | 2014015007 A | 5/2016 |
| WO | 2008026997 A1 | 3/2008 |

OTHER PUBLICATIONS

Extended European Search Report dated Feb. 5, 2019 for European Patent Application No. 18202331.7, 11 pages.
García, Belén et al., "Development of a Moisture-in-Solid-Insulation Sensor for Power Transformers," Sensors, vol. 15, No. 2, Feb. 4, 2015, pp. 3610-3624.

\* cited by examiner

ELECTRICAL DEVICE PROVIDED WITH A MOISTURE SENSOR

CROSS REFERENCE TO RELATED APPLICATIONS

This application is a 35 U.S.C. § 371 national stage application of PCT International Application No. PCT/EP2019/078269 filed on Oct. 17, 2019, which in turns claims foreign priority to European Patent Application No. 18202331.7, filed on Oct. 24, 2018, the disclosures and content of which are incorporated by reference herein in their entirety.

TECHNICAL FIELD

The present disclosure generally relates to electrical devices such as transformers and reactors, and in particular to moisture detection in such devices.

BACKGROUND

It is of great practical interest to predict the age and estimate the remaining life of large power transformers for reliable operation and optimal asset management. It is well known that the transformer life is mainly decided by degradation in its insulation, especially the solid insulation typically formed by cellulose paper and pressboard. Two important factors that decide the transformer solid insulation degradation are temperature and moisture.

The paper "Development of a moisture-in-solid-insulation sensor for power transformers", by Garcia et al published in Sensors 2015, 15, 3610-3624, discloses a sensor that is used for measuring moisture in a power transformer. The sensor includes a probe constituted of a coil of Kraft paper located between two metallic plates, forming a cylindrical capacitor. The probe is fit in the transformer tank and operates immersed in the transformer oil. The probe should ideally be inserted into the hot oil flow and as close as possible to the winding. If the probe is installed in a different position or if the distribution of moisture throughout the winding needs to be estimated, further calculations might be done considering the distribution of temperature on the winding and using a moisture diffusion model. The moisture content of the Kraft paper coil is derived from the measurement of its dielectric response.

One drawback with the sensor presented in this paper is that it may only be used in some neutral/low-gradient regions of the transformer, and will therefore not capture the moisture dynamics of the winding hot spot.

U.S. Pat. No. 3,961,246 A discloses a capacitance method of monitoring insulation dryness of an electrical induction apparatus.

MX 2014 015 007 A discloses a system for the monitoring and fault detection in current transformers. The system comprises multiple measurement electrodes distributed along the active part of the current transformer located between the central conductor and the system for controlling the electric field. The electrodes are useful for obtaining the measurement and recording the parameters which allow the insulation state in different zones of transformer to be assessed, with the aim of locating evolving faults caused by moisture or degradation of the oil/paper insulation system.

US 2004/100285 A1 discloses a grain moisture sensor having a sensor cell that includes a driven plate, a sense plate proximate to and substantially parallel with the driven plate for capacitive measurement across a spacing between the driven plate and the sense plate, and a fill plate adjacent the sense plate and substantially parallel with the driven plate for sensing whether the spacing is filled with grain.

SUMMARY

The present inventor has realised that the electrodes, when located inside an electrical device, such as a transformer or reactor, will create partial discharges due to the electric field gradient that exists inside such devices.

In view of the above, an object of the present disclosure is to provide an electrical device which solves, or at least mitigates, the problems of the prior art.

There is hence provided an electrical device comprising: voltage carrying components, a solid insulation system configured to electrically insulate the voltage carrying components, and a moisture sensor configured to detect moisture in the solid insulation system, wherein the moisture sensor comprises: a capacitor having a first electrode, a second electrode, and a dielectric material arranged between the first electrode and the second electrode, wherein the solid insulation system forms the dielectric material, the capacitance of the capacitor providing an indication of a moisture level in the dielectric material.

Since the dielectric material forms part of the solid insulation system, any capacitance change will provide a direct measure of the moisture in the solid insulation system at the location of the moisture sensor.

The first electrode and the second electrode may have end portions bent away from the dielectric material to follow the profile of the electric field line. The end portions thereby form a cylindrical shape of the first electrode and the second electrode. The first electrode and the second electrode may have a Rogowski profile.

One embodiment comprises a shield member electrically connected to the first electrode.

The shield member forms an equipotential screen with the first electrode, which thereby reduces the risk of partial discharges. Therefore, the moisture sensor may be installed in regions with high electric field gradient. The capturing of moisture dynamics in hot spot regions may thereby be improved. Such hot spot regions may for example be inside a winding.

The shield member may have end portions bent away from the first electrode to follow the profile of the electric field line. The end portions thereby form a cylindrical shape of the shield member. The shield member may have a Rogowski profile.

According to one embodiment the shield member comprises a metal plate extending parallel with the first electrode. The plate preferably defines a continuous surface without a meshed-structure and without voids.

The shield member may be arranged with a gap from the first electrode. The shield member may be arranged parallel with and spaced apart from the first electrode.

The shield member may be arranged with a gap from the second electrode. The shield member may be arranged parallel with and spaced apart from the first electrode.

One embodiment comprises a spacer configured to distance the shield member from the first electrode to facilitate moisture migration. Moisture migration may thereby be facilitated.

According to one embodiment the first electrode has a meshed structure configured to facilitate moisture migration to and from the dielectric material.

According to one embodiment the second electrode has a meshed structure configured to facilitate moisture migration to and from the dielectric material.

According to one embodiment the solid insulation system comprises a cellulose-based material.

One embodiment comprises an external housing and a dielectric fluid, wherein the external housing is filled with the dielectric fluid.

According to one embodiment the dielectric fluid is a dielectric liquid such as oil or an ester.

According to one embodiment the sold insulation system comprises a shield ring, wherein the moisture sensor is attached to the shield ring, the dielectric material being formed by the shield ring.

One embodiment comprises a winding, wherein the solid insulation system comprises a cylinder barrier arranged around the winding, wherein the moisture sensor is attached to the cylinder barrier, the dielectric material being formed by the cylinder barrier.

According to one embodiment the solid insulation system comprises press ring, wherein the moisture sensor is attached to the press ring, the dielectric material being formed by the press ring.

According to one embodiment the solid insulation system comprises a bushing lead insulation structure, wherein the moisture sensor is attached to the bushing lead insulation structure, the dielectric material being formed by the bushing lead insulation structure.

One embodiment comprises a voltage divider configured to be connected between two voltage potentials inside the electrical device, wherein the voltage divider is configured to energise the capacitor.

According to one embodiment the electrical device is a high voltage electrical device.

According to one embodiment the electrical device is a transformer, a reactor or a bushing.

One embodiment comprises a plurality of distributed temperature sensors configured to measure the temperature in a plurality of locations in the electrical device.

The distributed temperature sensors may for example be in the form of a fibre optic sensor system such as a fibre Bragg grating system.

One embodiment may comprise a reference temperature sensors configured to measure the temperature in a region of or at the moisture sensor. The location of the moisture sensor may be a reference location.

The electrical device may form part of an electrical device system comprising a moisture determining unit provided with a dynamic moisture diffusion model which is configured to be calibrated or tuned based on a moisture measurement by means of the moisture sensor and a temperature measurement by the reference temperature sensor at the reference location. According to one embodiment, the moisture level at the location of any of the distributed temperature sensors may be determined using the measured temperature from a temperature sensor in a location of interest as input to the dynamic moisture diffusion model to obtain the moisture level at the location of interest.

Alternatively, the temperature at a location of interest in the electrical device may be estimated, and the estimated temperature may be used as input to the dynamic moisture diffusion model to obtain the moisture level at the location of interest. The estimation may for example be made by means of a reduced order model or a computational fluid dynamic model.

The dynamic moisture diffusion model is based on actual measured data, i.e. temperature and moisture level, inside the same electrical device as the location of interest, which thus experiences the same ambient temperature dynamics, loading conditions and e.g. cooling system operations. The moisture level determination in a location of interest will therefore be more accurate.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc.", unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
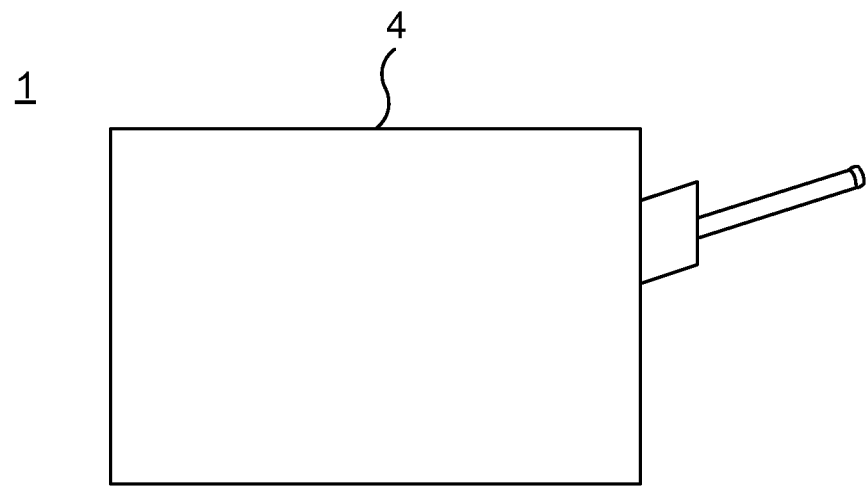
FIG. 1 schematically shows a side view of an example of an electrical device.

FIG. 1 depicts an example of an electrical device 1. The electrical device 1 may for example an electromagnetic induction device, e.g. a transformer such as a power transformer or a reactor, or a bushing. The electrical device may typically be a high voltage or medium voltage electrical device. The electrical device 1 may for example be a high voltage direct current (HVDC) electrical device.

The electrical device 1 comprises an external housing 4. The electrical device 1 comprises one or more voltage carrying components, such as one or more conductors, for example one or more windings. The one or more voltage carrying components are arranged inside the external housing 4.

The electrical device 1 furthermore comprises a solid insulation system configured to electrically insulate the one or more voltage carrying components. The solid insulation system may for example be cellulose-based. The solid insulation system may for example comprise pressboard.

The electrical device 1 may comprise a dielectric fluid, such as a dielectric liquid. The dielectric liquid may be oil, such as transformer oil, or an ester. The external housing 4 may be filled with the dielectric fluid. The voltage carrying components and the solid insulation system may hence be immersed in the dielectric fluid.

Figure 2:
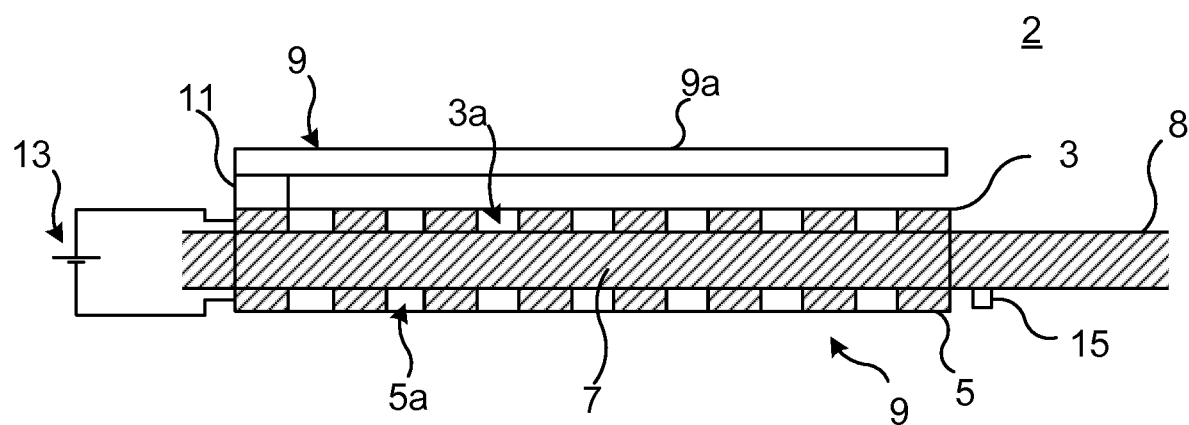
FIG. 2 schematically shows a side view of an example of a moisture sensor.

The electrical device 1 comprises a moisture sensor. FIG. 2 depicts an example of such a moisture sensor 2. The moisture sensor 2 is configured to provide a measure of moisture, i.e. a moisture level, in the solid insulation system 8 of the electrical device 1. The exemplified moisture sensor 2 comprises a first electrode 3 and a second electrode 5. The moisture sensor 2 furthermore comprises a dielectric material 7 sandwiched between the first electrode 3 and the second electrode 5. The dielectric material 7 forms part of the solid insulation system 8 of the electrical device 1. The solid insulation system 8 hence forms the dielectric material 7. The first electrode 3 and the second electrode 5 are thus preferably provided directly on a respective side of a portion of the solid insulation system 8. The moisture sensor 2 is hence built in or integrated with the solid insulation system 8. The location of the moisture sensor 2 on the solid insulation system 8 will in the following be referred to as a reference location.

The first electrode 3, the second electrode 5 and the dielectric material 7 form a capacitor 9. The capacitor 9 has a capacitance which is dependent of the moisture level in the dielectric material 7. In particular, the permittivity of the dielectric material 7 is dependent of the moisture level, and the capacitance is dependent of the permittivity. Thus, depending on the moisture level in the dielectric material 7, i.e. in the solid insulation system 8 between the first electrode 3 and the second electrode 5, the permittivity and thus the capacitance of the capacitor 9 is changed. The capacitance hence provides a measure of the moisture level in the dielectric material 7.

The first electrode 3 may preferably have a meshed structure, as schematically illustrated by through-openings 3a. The meshed structure facilitates moisture migration to and from the dielectric material 7, i.e. the portion of the solid insulation system 8 located adjacent to the first electrode 3.

The second electrode 5 may preferably have a meshed structure, as schematically illustrated by through-openings 5a. The meshed structure facilitates moisture migration to and from the dielectric material 7, i.e. the portion of the solid insulation system 8 located adjacent to the second electrode 5.

The moisture sensor 2 may have a shield member 9 electrically connected to the first electrode 3. The shield member 9 functions as an equipotential screen. The shield member 9 comprises a metal plate 9a extending parallel with the first electrode 3. The moisture member 2 may have a spacer 11 configured to distance the shield member 9 from the first electrode 3 to facilitate moisture migration. The shield member 9 is hence preferably spaced apart from the first electrode 3.

The first electrode 3 and the second electrode 5 are preferably connected to a power source 13 to obtain an electric potential between the first electrode 3 and the second electrode 5. The electrical device 1 may for example comprise a voltage divider connected between two voltage potentials inside the electrical device 1, configured to energise the capacitor 9. The voltage divider may for example comprise two suitably dimensioned resistors and the first electrode 3 may be connected to one end of one of the resistors and the second electrode 5 may be connected to the other end of the same resistor. Beneficially, in this manner, no external power source is required.

The electrical device 1 may comprise a reference temperature sensor 15 configured to measure the temperature at the reference location, i.e. in the region of the moisture sensor 2, for example at or adjacent the moisture sensor 2. Thus, according to this example, the temperature as well as the moisture level may be measured at the reference location.

Figure 3:
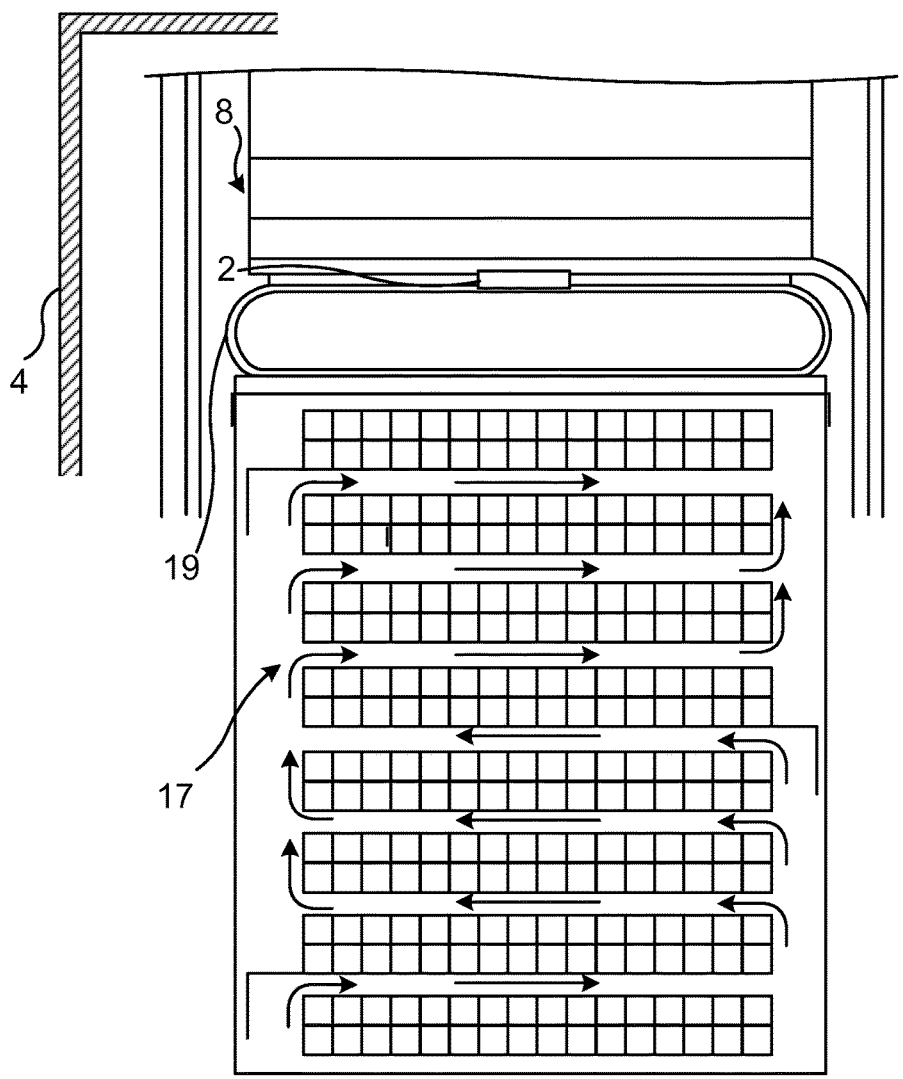
FIG. 3 shows a cross-section of a portion of an electrical device comprising a moisture sensor.

FIG. 3 schematically shows a portion of the interior of one example of the electrical device 1, with the arrows showing a dielectric liquid flow direction. In this example, the electrical device 1 comprises a winding 17 and a portion of the winding 17 is shown. According to the present example, the solid insulation system 8 includes a shield ring 19 and the moisture sensor 2 is integrated with the shield ring 19, such that the dielectric material 7 forms part of the shield ring 19. The moisture sensor 2 is hence attached to the shield ring 19.

Other examples of where the moisture sensor 2 may beneficially be arranged on the solid insulation system 8, with the dielectric material 7 forming part of the solid insulation system 8, of an electrical device 1 are a press ring, a portion of the solid insulation system arranged around the yoke of the electrical device, on a cylinder barrier arranged around the winding, a bushing lead insulation structure, and an insulated piece of solid insulation near the top of the dielectric liquid.

According to one example, the electrical device 1 may comprise a plurality of temperature sensors distributed in the electrical device 1. Each temperature sensor may be configured to measure the temperature at a respective location of interest or hot spot region in the electrical device 1. The temperature sensors arranged distributed in the electrical device 1 may for example be in the form of a fibre Bragg grating system.

As an alternative to measuring the temperature by means of temperature sensors distributed in the electrical device 1, the temperature in any location of interest or hot spot may be estimated, for example by means of a reduced order model or a computational fluid dynamic model.

Figures 4, 5:
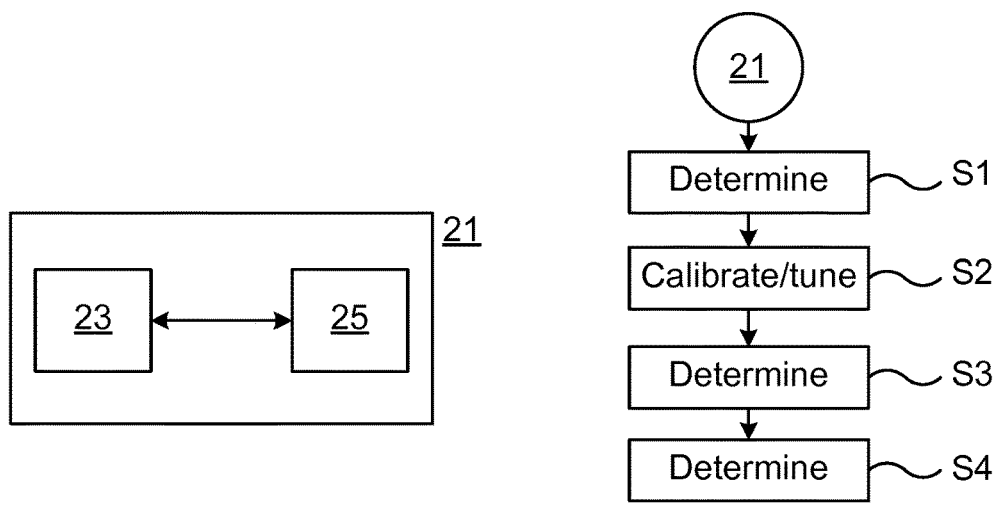
FIG. 4 schematically shows a block diagram of a moisture determining unit.
FIG. 5 is a flow chart of a method of estimating a moisture level in the electrical device.

The electrical device 1 may form part of an electrical device system comprising a moisture determining unit 21, as shown in FIG. 4. The moisture determining unit 21 may comprise a storage medium 23 in which a dynamic moisture diffusion model is stored, and processing circuitry 25 configured to execute computer code stored by the storage medium 23. For example, the moisture determining unit 21 may be configured to receive moisture measurements from the moisture sensor 2 and temperature measurements from the reference temperature sensor 15 and calibrate/tune the dynamic moisture diffusion model, i.e. the parameters of the dynamic moisture diffusion model, based on the moisture measurements and temperature measurements to optimise the dynamic moisture diffusion model to the actual electrical device 1.

According to one example, the moisture determining unit 21 is configured to estimate the moisture level in a location of interest, which is in a region of any of the temperature sensors, based on the temperature measured by the temperature sensor in the location of interest. In particular, the measured temperature is used as input for the dynamic moisture diffusion model, whereby the moisture level in the location of interest may be estimated. Alternatively, in case the temperature is instead estimated in a location of interest, the estimated temperature is used as input for the dynamic moisture diffusion model, whereby the moisture level in the location of interest may be estimated.

FIG. 4 shows a flowchart of an example of a method to estimate the moisture level at a location of interest or hot spot region inside the electrical device 1.

In a step S1, the moisture level in the reference location is determined by measurements from the moisture sensor 2. In particular, the moisture level is determined based on the capacitance or permittivity of the moisture sensor 2.

The temperature at the reference location is also determined by means of the reference temperature sensor 15.

In a step S2, the dynamic moisture diffusion model is calibrated/tuned based on the moisture level and temperature at the reference location, as obtained in step S1.

In a step S3, the temperature at a location of interest is determined by measurement by a temperature sensor or by estimation by the moisture determining unit 21.

In a step S4, the moisture level at the location of interest is determined based on the temperature at the location of interest using the dynamic moisture diffusion model as calibrated/tuned in step S2.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. An electrical device comprising:
   voltage carrying components,
   a solid insulation system configured to electrically insulate the voltage carrying components,
   a moisture sensor configured to detect moisture in the solid insulation system, wherein the moisture sensor comprises:
      a capacitor having:
         a first electrode,
         a second electrode, and
         a dielectric material arranged between the first electrode and the second electrode, wherein the solid insulation system forms the dielectric material,
      the capacitance of the capacitor providing an indication of a moisture level in the dielectric material;
      a shield member electrically connected to the first electrode, and
      a spacer configured to distance the shield member from the first electrode to facilitate moisture migration,
   wherein the first electrode has a meshed structure configured to facilitate moisture migration to and from the dielectric material.

2. The electrical device as claimed in claim 1, wherein the shield member comprises a metal plate extending parallel with the first electrode.

3. The electrical device as claimed in claim 1, wherein the second electrode has a meshed structure configured to facilitate moisture migration to and from the dielectric material.

4. The electrical device as claimed in claim 1, wherein the solid insulation system comprises a cellulose-based material.

5. The electrical device as claimed in claim 1, comprising an external housing and a dielectric fluid, wherein the external housing is filled with the dielectric fluid.

6. The electrical device as claimed in claim 5, wherein the dielectric fluid is a dielectric liquid such oil or an ester.

7. The electrical device as claimed in claim 1, wherein the sold insulation system comprises a shield ring, wherein the moisture sensor is attached to the shield ring, the dielectric material being formed by the shield ring.

8. The electrical device as claimed in claim 1, comprising a winding, wherein the solid insulation system comprises a cylinder barrier arranged around the winding, wherein the moisture sensor is attached to the cylinder barrier, the dielectric material being formed by the cylinder barrier.

9. The electrical device as claimed in claim 1, wherein the solid insulation system comprises press ring, wherein the moisture sensor is attached to the press ring, the dielectric material being formed by the press ring.

10. The electrical device as claimed in claim 1, wherein the solid insulation system comprises a bushing lead insulation structure, wherein the moisture sensor is attached to the bushing lead insulation structure, the dielectric material being formed by the bushing lead insulation structure.

11. The electrical device as claimed in claim 1, comprising a voltage divider configured to be connected between two voltage potentials inside the electrical device, wherein the voltage divider is configured to energise the capacitor.

12. The electrical device as claimed in claim 1 wherein the electrical device is a transformer, a reactor or a bushing.

* * * * *